United States Patent [19]

Wolf et al.

[11] Patent Number: 5,123,509
[45] Date of Patent: Jun. 23, 1992

[54] CONTROL VALVE FOR A HYDRAULIC SWITCH CLUTCH

[75] Inventors: Dieter Wolf; Elmar Roeseling, both of Cologne, Fed. Rep. of Germany

[73] Assignee: Ford Motor Company, Dearborn, Mich.

[21] Appl. No.: 702,486

[22] Filed: May 20, 1991

[51] Int. Cl.$^5$ .................. B60K 41/02; E16D 25/14
[52] U.S. Cl. .................. 192/0.034; 192/0.075; 192/109 F; 74/868; 91/31
[58] Field of Search ............ 192/0.034, 0.075, 109 F; 74/868; 91/31

[56] References Cited

U.S. PATENT DOCUMENTS

| | | | |
|---|---|---|---|
| 3,583,422 | 6/1971 | Dach et al. | 192/109 F X |
| 3,792,763 | 2/1974 | Enomoto | 192/0.075 |
| 4,265,346 | 5/1981 | Emmadi | 192/0.034 |

FOREIGN PATENT DOCUMENTS 3417784 11/1985 Fed. Rep. of Germany.

*Primary Examiner*—Richard Lorence
*Attorney, Agent, or Firm*—Frank G. McKenzie; Roger L. May

[57] ABSTRACT

Hydraulic pressure representing engine throttle position is applied to a valve spool having two control surfaces. In opposition to the force of a control spring, a pressure line, which opens to the valve chamber between the two control surfaces, carries regulated line pressure through a flow orifice in a first connecting line and through an aperture stop in a second connecting line. The flow orifice of the first connecting line is arranged in parallel with an aperture of the second connecting line, both the first and second connecting lines being connected directly to the valve chamber.

4 Claims, 1 Drawing Sheet

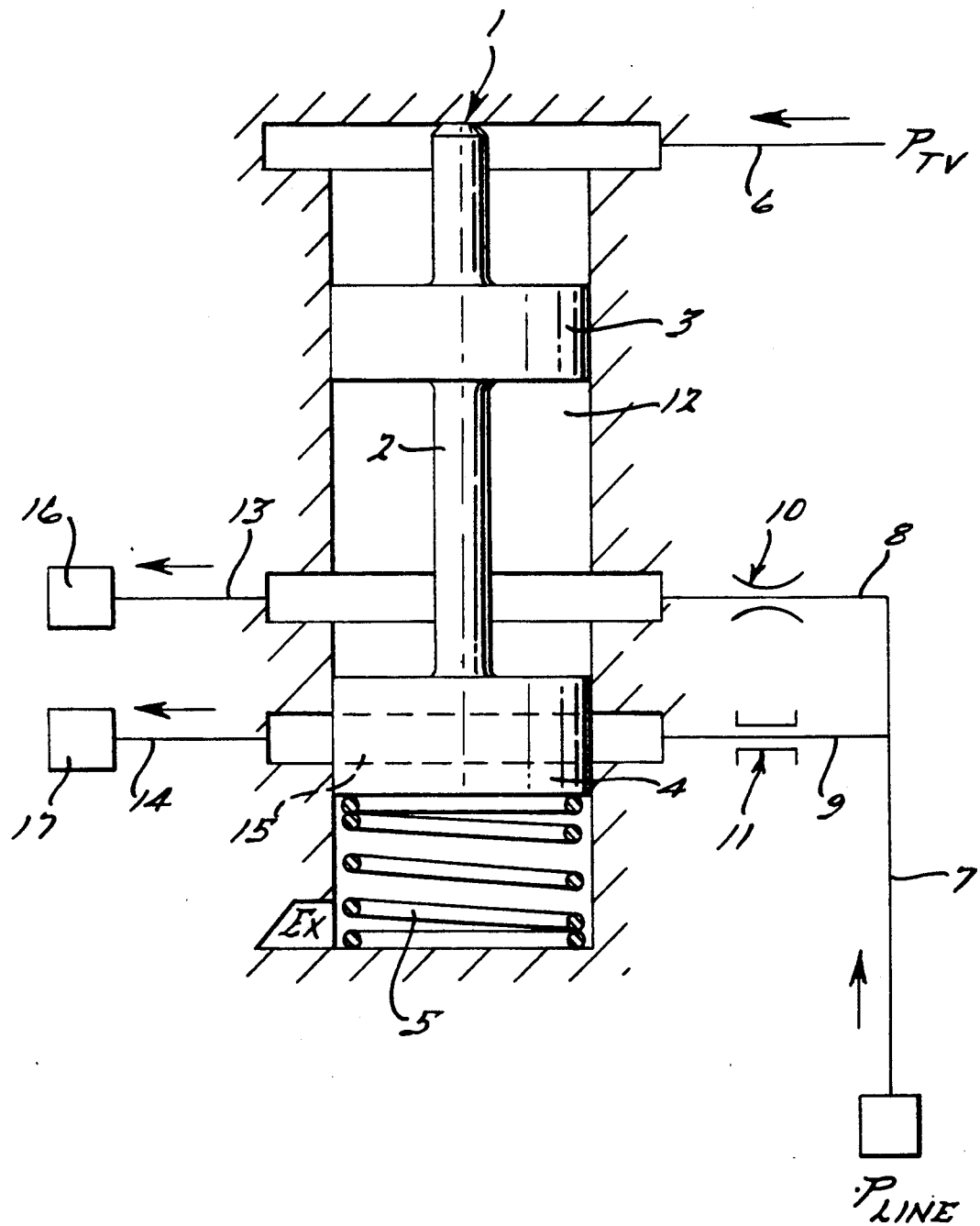

CONTROL VALVE FOR A HYDRAULIC SWITCH CLUTCH

BACKGROUND OF THE INVENTION

1. Field of the Invention

This invention relates to the field of automatic transmission hydraulic control circuits that supply regulated line pressure to a hydraulic clutch of the transmission. In particular, the invention relates to a control valve operating in such a circuit on the basis of a pressure signal representing engine throttle position.

2. Description of the Prior Art

A control valve of this type is known from German Offenlegungsschrift DE-PS 34 17 784. A bypass line leading to the control valve includes a first connecting line having a flow orifice and is connected to a control pressure line that supplies a clutch actuated in all forward gears of the transmission. The control pressure line is directed through a branch of the bypass line to a chamber of the control valve. Regulated line pressure is directed through an aperture stop of a second connecting line of the control valve to a control pressure line leading to the clutch. Line pressure is supplied to the clutch when one control surface or collar of the valve spool has cleared the second connecting line against the force of a control spring and as a function of throttle pressure and line pressure downstream of the orifice in the first connecting line. The control valve is located in a valve bore that contains also a 1-2 shift valve and a 2-3 damper valve, loaded also with throttle pressure and interconnected to the individual gear shift valves of a control device, in which a shift pressure line is branched from the control pressure of the clutch. The branch is located at a point downstream of the flow orifice so that an aperture stop is connected through to the gear shift valves only after clearance of the second connecting line by one control surface of the valve spool.

U.S. Pat. No. 4,265,346 describes a control valve system for controlling the capacity of a hydraulic clutch in a power transmission wherein the clutch torque is nearly equal to engine torque resulting in a smooth clutch engagement as a torque transmitting path is established between the engine and a driven member.

SUMMARY OF THE INVENTION

An object of this invention is to provide a control valve that operates with greater sensitivity to variations in throttle pressure to actuate the clutch of the transmission than those in the prior art. In the control valve of this invention, hydraulic pressure representing engine throttle position is applied to a valve spool having two control surfaces. In opposition to the force of a control spring, a pressure line, which opens to the valve chamber between the two control surfaces, carries regulated line pressure through a flow orifice in a first connecting line and through an aperture in a second connecting line. The flow orifice of the first connecting line is arranged in parallel with an aperture of the second connecting line, both the first and second connecting lines being connected directly to the valve chamber.

Because of the direct connection of the control pressure line to the clutch and the first connecting line having the flow orifice to the clutch, regulated line pressure is carried through the control valve during each shift of the transmission initiated by the manual selection valve for forward travel of the vehicle. The path through which fluid is conveyed results principally because the flow orifice precedes the control valve and the first connecting line. If the flow orifice has a diameter of about 1.5 mm, a delayed conveyance of regulated line pressure to the connected clutch results for the installed condition of the control valve when the manual selector valve changes from the neutral position or from the R-position into the D-position, where all forward gears of the transmission are automatically shifted. The clutch is applied gently due to this delayed transfer of regulated line pressure.

If the vehicle is to be started with an increased engine torque, the valve spool is brought against the force of the control spring into a shift position where the second connecting line having the aperture is no longer blocked against communication with the valve chamber. If the aperture has a flow control area of about 45 mm$^2$ and the flow orifice diameter is about 1.5 mm, then accelerated application of the clutch results due to the additional connection of the aperture stop to the clutch as a result of the prevailing throttle pressure. The higher clutch capacity produced by the control valve of this invention results in improved performances of the clutch and is advantageous for operation of the vehicle in winter.

Connection of the line containing the aperture stop in addition to the line containing the flow orifice while filling the clutch helps in driving with a cold engine. During cold temperature conditions when additional fuel injection is present, an increase in throttle pressure above the pressure for the installed condition of the control valve for startup with a hot engine, allows accelerated displacement of the control valve spool against the force of the control spring.

The control valve according to this invention can be installed directly into the valve bore of the 1-2 transition valve without major alterations. If, for this purpose, the control valve includes a third connecting line leading to the gear-change shift valves and connected to the second connecting line downstream of the aperture, the shift points at the gear change shift valves connected through the third connecting line are influenced independently of the clutch application process. On the other hand, by appropriate calibration of the control spring, damping of the clutch can be modified.

BRIEF DESCRIPTION OF THE DRAWING

The figure shows schematically a control valve for use in a hydraulic control device for an automatically shifting transmission.

DESCRIPTION OF THE PREFERRED EMBODIMENT

The control valve 1 can be used in the embodiment according to the DE-PS 34 17 784, where it is installed with its control spool 2 located on the valve bore that also contains 1-2 transition valve 448. Valve 1 can be supplied by a separate circuit through an additional wall of the valve housing.

The spool 2 of the control valve has two control surfaces 3, 4 of equal diameter, as does the spool at the lower end of the valve bore in the 1-2 transition valve shown in FIG. 3B of the '784 patent. The end face of control surface 4 is loaded by control spring 5, which rests in the valve bore. The spring force operates in opposition to a pressure force developed on an end face of control surface 3 by application of throttle pressure $P_{TV}$, which varies in accordance with torque produced by the engine that drives the transmission. Throttle pressure produced by a throttle pressure valve is conveyed through connecting line 6 to the end face of control surface 3 so that the pressure force tends to move the spool, against the force of the control spring, from the installed condition shown in the drawing.

Control valve 1 is connected to pressure line 7, which carries regulated line pressure $P_{LINE}$ of the hydraulic system and is connected to a manual selector valve. The pressure in line 7 branches into two parallel connecting lines 8, 9, which are connected through a flow orifice 10 and an aperture 11, respectively, to the valve chamber 12 of the control valve.

In the installed condition of the control valve, only first connecting line 8 has a direct connection through orifice 10 and valve chamber 12 to a control pressure line 13, which leads to a hydraulic clutch 16, such as clutch CL3 of the '784 patent. The hydraulic circuit of the '784 patent requires that clutch CL3 be applied whenever the transmission operates in the forward drive direction. In the installed condition of the control valve, second connecting line 9 and aperture 11 are blocked by control surface 4 of the valve spool 2. A third connecting line 14, which is a shift pressure line separate from control pressure line 13, leads to the gear change shift valves 17 of the hydraulic system and is connected through an annular duct 15 to the second connecting line 9 downstream of the aperture 11.

When second connecting line 9 is blocked by control surface 4 against valve chamber 12, regulated line pressure is conveyed only through flow orifice 10 to the clutch through control pressure line 13. However, when spool 2 is moved by a pressure force acting on the end face of the control surface 3 due to pressure supplied to control valve 1 by a throttle pressure valve, regulated line pressure then is also carried through aperture 11 of the second connecting line into the valve chamber 12 and from there into the control pressure line 13. When this occurs, the clutch is filled faster.

Aperture 11 is permanently connected by annular duct 15 to connecting line 14 so that the gear change shift valves can be supplied with a shift pressure independently of the control pressure supplied to the clutch.

Having described an embodiment of our invention, we claim:

1. In a hydraulic control system including a source of regulated line pressure and gear-change shift valves, a valve for supplying hydraulic pressure to a friction element of an automatic transmission, comprising:
    a spool slidable in a valve chamber, urged by a spring toward an installed position in the valve chamber, the spool having first and second control surfaces thereon;
    a source of variable fluid pressure representing a magnitude of torque, communicating with the first control surface and opposing the effect of the spring;
    a first line including a flow orifice connecting the regulated line pressure source to said friction element when the spool is at the installed position;
    a second line including an aperture connected to the line pressure source in parallel flow arrangement with the first line, blocked by the second control surface when the spool is at the installed position and;
    a third line continually connecting the gear-change shift valves to the line pressure source through the second line.

2. In a hydraulic control system including gear-change shift valves, a valve for supplying hydraulic pressure to a friction element of an automatic transmission, comprising:
    a source of variable fluid pressure representing a magnitude of torque;
    a source of regulated line pressure;
    a first line connected to the line pressure source;
    a second line connected to the line pressure source in parallel flow arrangement with the first line;
    control means urged toward an installed position, for connecting the line pressure source to said friction element when the control means is at the installed position and for blocking the second line when the control means is at the installed position; and
    a third line continually connecting the gear-change shift valves to the line pressure source through the second line.

3. The valve of claim 2 wherein the first line further comprises a flow orifice and the second line further comprises an aperture.

4. In a hydraulic control system including a source of regulated line pressure and gear-change shift valve, a device for supplying hydraulic pressure to a friction element of an automatic transmission, comprising:
    a source of variable fluid pressure representing a magnitude of torque;
    a first pressure line including a flow orifice connecting the line pressure source to a control means;
    a second pressure line including an aperture connecting the line pressure source to the control means; and
    control means subject to torque pressure for opening the first pressure line to the friction element and closing the second pressure line to the friction element when torque pressure is relatively low, and for opening the first and second pressure lines to the friction element when torque pressure is relatively high and third line to the gear-change shift valves continually connected through the control means to the second fluid pressure line.

* * * * *